United States Patent [19]

Nelson

[11] Patent Number: 5,303,733
[45] Date of Patent: Apr. 19, 1994

[54] PRESSURE REGULATING UNIT FOR BEVERAGE DISPENSING SYSTEM

[75] Inventor: John Nelson, Durham, N.H.

[73] Assignee: Robertshaw Controls Company, Richmond, Va.

[21] Appl. No.: 14,843

[22] Filed: Feb. 8, 1993

[51] Int. Cl.⁵ .................. F16K 11/18; F16K 27/00; G05D 16/06
[52] U.S. Cl. .................. 137/505.38; 137/552; 137/557; 137/883; 137/885
[58] Field of Search .............. 137/597, 861, 883, 885, 137/505.38, 552, 557

[56] References Cited

U.S. PATENT DOCUMENTS

| | | | |
|---|---|---|---|
| 3,834,417 | 9/1974 | Holben et al. | 137/861 X |
| 4,171,004 | 10/1979 | Cerrato et al. | 137/505.11 |
| 4,174,733 | 11/1979 | Eidsmore et al. | 137/883 X |
| 4,570,677 | 2/1986 | Roxton et al. | 137/883 X |
| 4,846,226 | 7/1989 | Merritt | 137/885 X |
| 4,870,994 | 10/1989 | Raymond | 137/883 X |

OTHER PUBLICATIONS

Multiplex literature, "Simple Solutions, A Specification Guide for Soft Drink Systems in All Installations" no date.
Dobario Enterprises, Inc. product literature, no date.
Standard-Keil product literature, no date.
Coca-Cola Installation Manual for Ice-Cooled Drop-In Dispenser Installation, p. 8.

Primary Examiner—Stephen M. Hepperle
Attorney, Agent, or Firm—Fish & Richardson

[57] ABSTRACT

A pressure regulating unit for providing controlled pressure for use in displacing syrups in a carbonated beverage dispensing system, the unit including a block made of a single piece of metal and having mounting structure integrally provided thereon and a high-pressure gas flow passage provided therein and having a high pressure inlet, the unit also including pressure regulators that are supported on the block and have gas inlets communicating with the high-pressure gas flow passage.

19 Claims, 7 Drawing Sheets

PRESSURE REGULATING UNIT FOR BEVERAGE DISPENSING SYSTEM

BACKGROUND OF THE INVENTION

The invention relates to a pressure regulating unit for providing controlled pressures for use in displacing liquid in a carbonated beverage dispensing system.

In restaurants and other facilities where carbonated beverages are prepared on demand, a single source of pressurized carbon dioxide gas is typically used to carbonate the water at a carbonator and to pump the different syrups for different beverages. The syrups typically are contained in canisters or in bag-in-box containers. Syrups for diet beverages typically have a different viscosity than syrups for non-diet beverages, and different pressures are used to pump the diet and non-diet syrups.

Typically a single carbon dioxide tank that delivers carbon dioxide at high pressure is used with two pressure regulators that are individually set to reduce their output pressures to the desired levels for the two types of syrup being dispensed. The carbon dioxide tank is typically connected to a wall-mounted pressure regulating system in which the regulators are mounted on a supporting bracket, and the high-pressure gas is passed from one regulator to another by a pipe connected between the two.

SUMMARY OF THE INVENTION

The invention features, in general, a pressure regulating unit for providing controlled pressures for use in displacing syrups in a carbonated beverage dispensing system. The regulating unit includes a block that is made of a single piece of metal and has an integral mounting means thereon and a high-pressure gas flow passage integrally provided therein. Two pressure regulators are supported on the block, and at least one pressure regulator has a gas inlet communicating with a port to the high-pressure gas flow passage. This construction simplifies the assembly of the unit and reduces the number of connections that need to be checked for gas leaks. It, in addition, provides for ease of mounting.

In preferred embodiments, both regulators have gas inlets communicating with the high-pressure gas flow passage. The metal block has inlet valve passages and reduced-pressure outlet chambers formed therein for each pressure regulator, and the pressure regulators have inlet valves mounted in respective inlet valve passages and movable diaphragms sealably mounted over the outlet chamber. The block also has outlet ports that are formed in it and communicate with the reduced-pressure outlet chambers. The pressure regulators include bonnets that are threadedly attached to the block at threaded openings that are formed in the block and surround the outlet chambers. Pressure relief valves are also carried on the block and communicate with the outlet chambers via passages formed in the block. Two pressure gauges are carried by the block and communicate with the respective outlet chambers via passages formed in the block. A third pressure gauge is carried by the block and communicates with the high-pressure gas flow passage. The block can be formed of an extrusion, and the high-pressure gas flow passage can be formed during the extrusion process, extending along an extrusion axis from one end of the extrusion to the other. The high-pressure pressure gauge can be connected on one end of the block, and the high-pressure gas inlet can be provided on the other. The block can have a mounting contact surface on its back, and the reduced-pressure outlet chambers for the pressure regulators can be formed on the front surface of the block. Alternatively, the reduced-pressure outlet chambers for the pressure regulators can be formed on the side surfaces of the block.

Other advantages and features of the invention will be apparent from the following description of a preferred embodiment thereof and from the claims.

BRIEF DESCRIPTION OF THE DRAWINGS

The drawings will be described first.

Drawings

Structure

Figure 1:
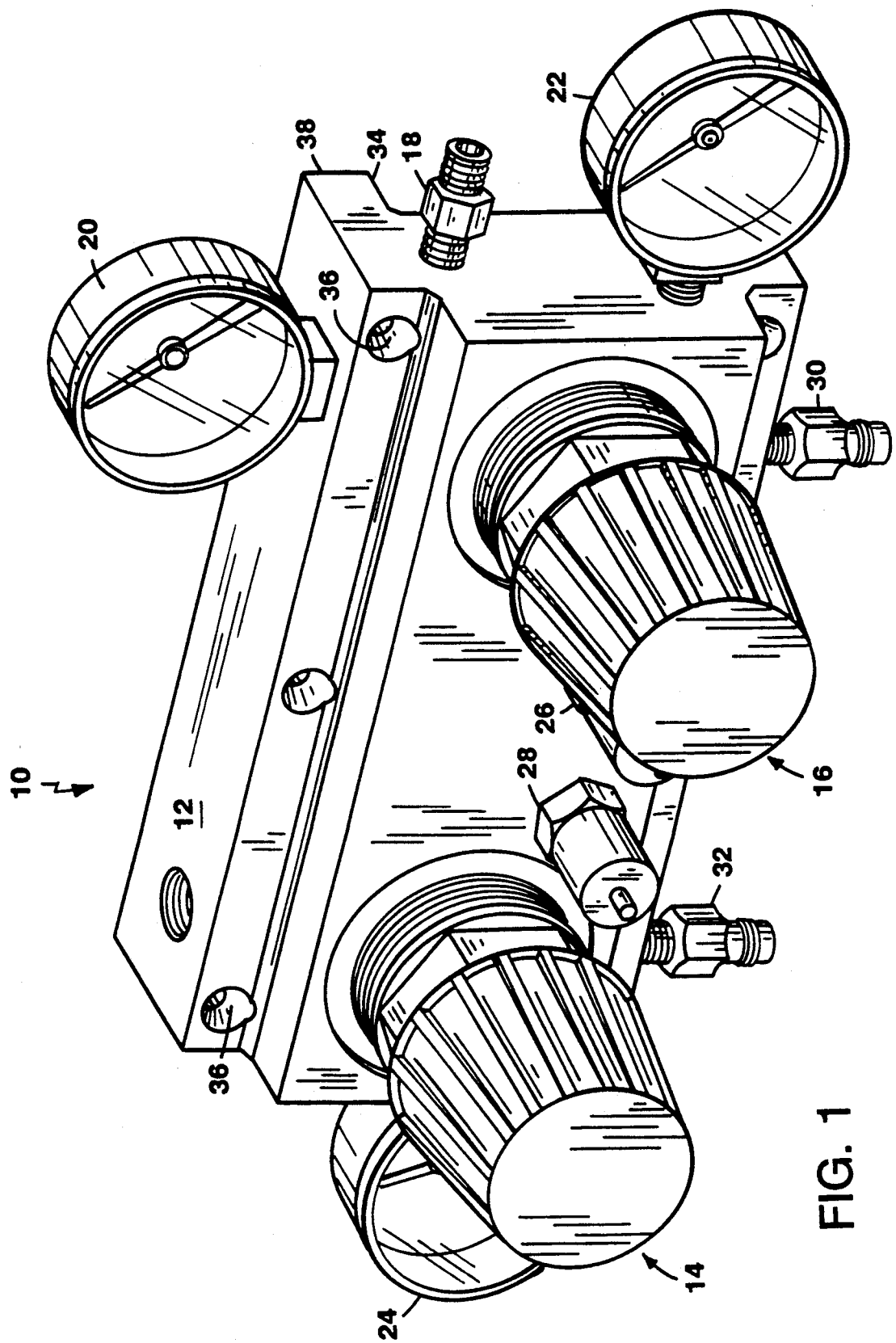
FIG. 1 is a perspective view of a pressure regulating unit according to the invention.
Figure 2:
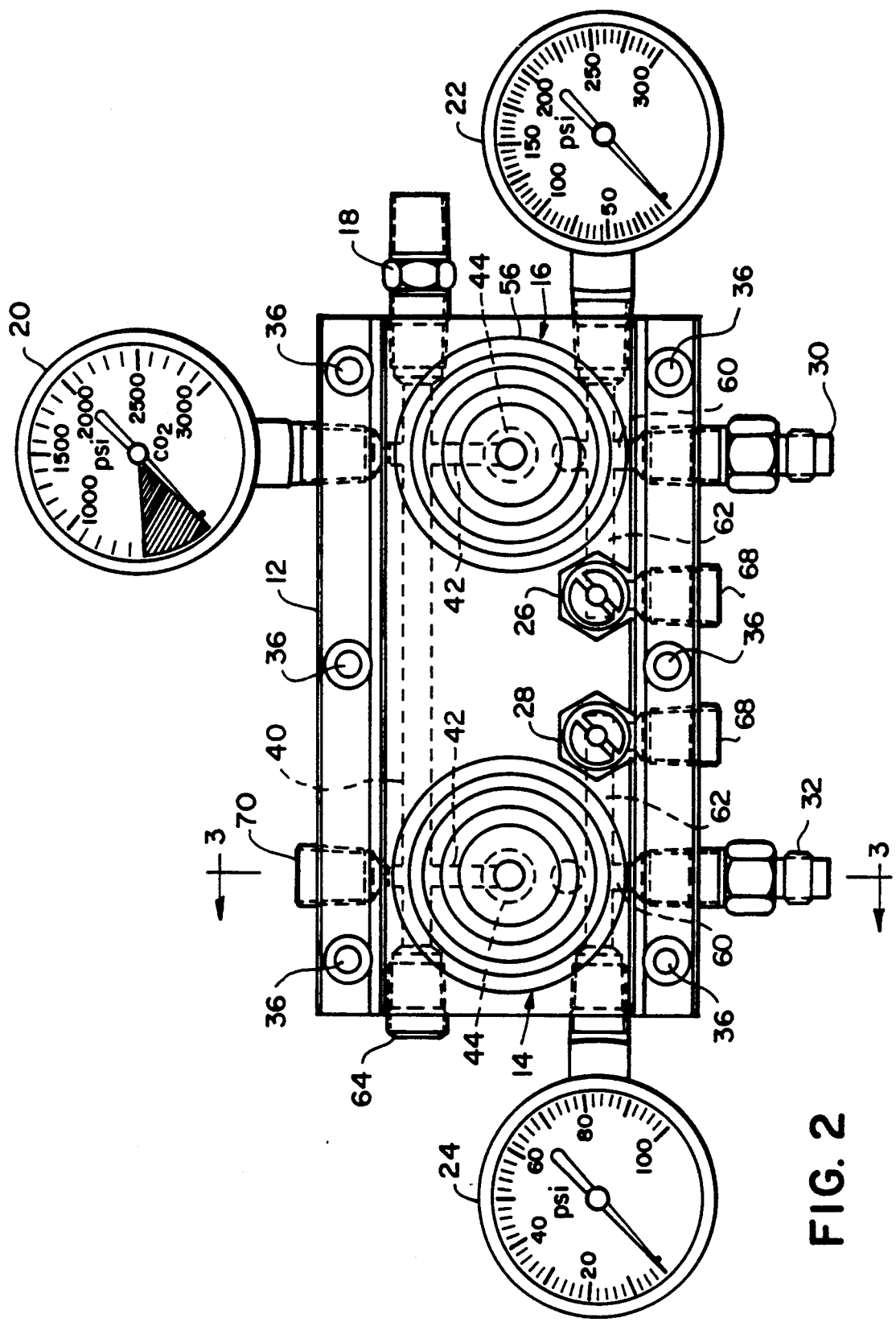
FIG. 2 is a front elevation of the FIG. 1 pressure regulating unit.
Figure 3:
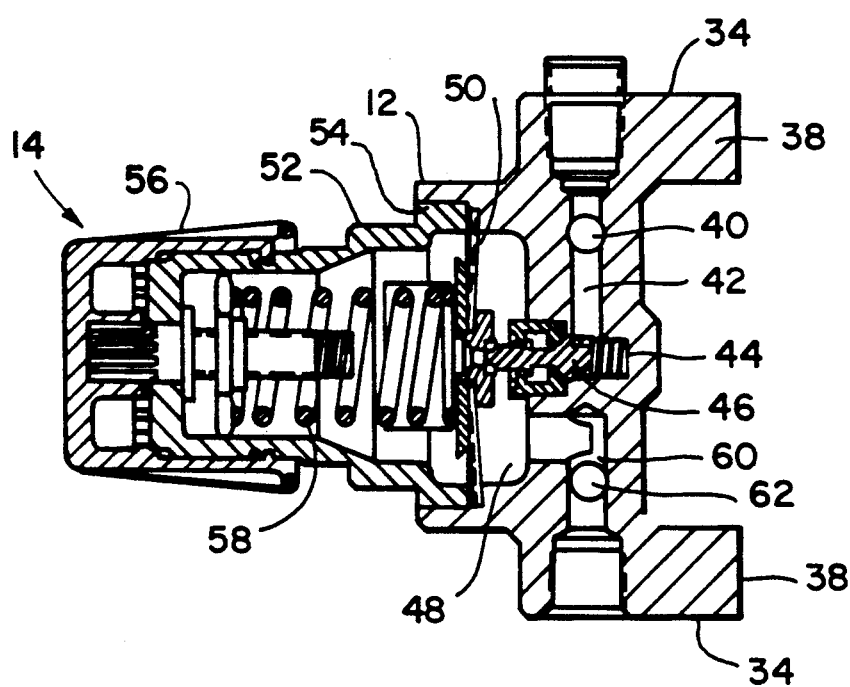
FIG. 3 is a vertical section, taken at 3—3 of FIG. 2, of the FIG. 1 pressure regulating unit.

Referring to FIGS. 1-3, pressure regulating unit 10 includes extruded aluminum block 12, pressure regulators 14, 16, high-pressure inlet fitting 18, high-pressure gauge 20, regulated pressure gauges 22, 24, pressure relief valves 26, 28, and regulated pressure outlet fittings 30, 32. Block 12 has upper and lower mounting legs 34 with mounting holes 36 therethrough from the front surface of the block to the back mounting contact surface 38.

High pressure inlet 18 communicates with high-pressure gas flow passage 40 provided from one side of block 12 to the other during extrusion of block 12. Passage 40 communicates with transverse passages 42, which provide ports to inlet valve passages 44. Inlet valves 46 of pressure regulators 14, 16, which are identical in construction, sit in inlet valve passages 44.

As can be seen from FIG. 3, inlet valve passage 44 and reduced pressure outlet chamber 48 are formed integrally in block 12. Diaphragm 50 covers outlet chamber 48 and is engaged by the end of bonnet 52, which is threadedly connected to threaded opening 54, formed in housing 12. Rotatable cap 56 adjusts the force on spring 58 to adjust the pressure resulting in reduced-pressure outlet chamber 48 by action of valve 46. Each outlet chamber 48 communicates with a vertical passage 60, extending to regulated pressure outlet fitting 30 (for regulator 16) or outlet fitting 32 (for regulator 14). Each passage 60 also communicates with a respective horizontal passage 62, each communicating with pressure gauge 22 or 24, each connected to a respective side of block 12, and to pressure relief valve 26 or 28.

The left-hand end of high-pressure gas flow passage 40 is sealed closed with plug 64. Vertical passages extending downward from relief valves 26, 28, which communicate with transverse passages 62, are similarly sealed by plugs 68. The openings sealed by plugs 68 can be used to connect fittings for additional regulated pressure outlets, if desired. The upper portion of the left-hand passage 42 is sealed closed by plug 70.

Figure 4:
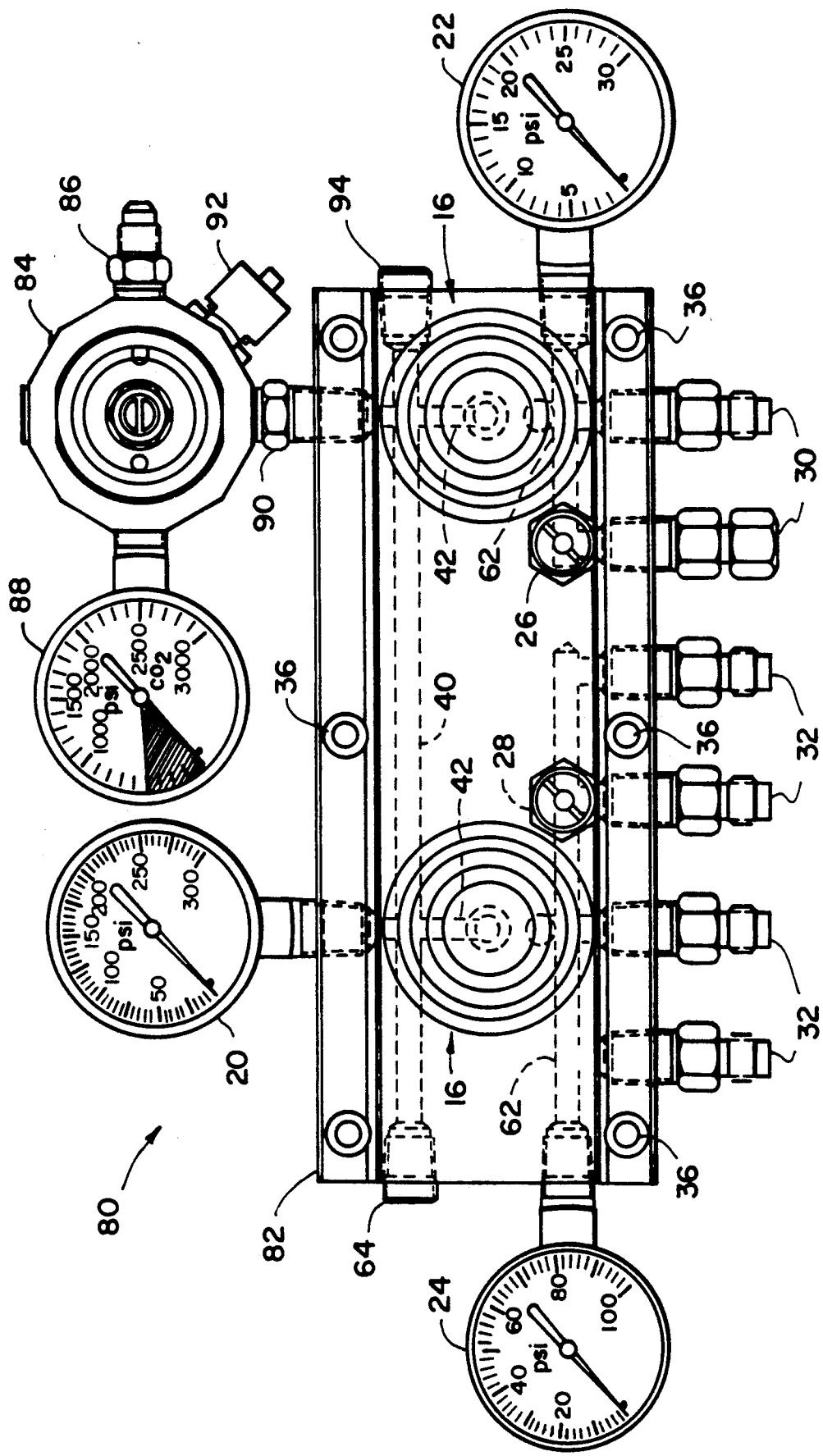
FIG. 4 is a front elevation of an alternative embodiment of a pressure regulating unit according to the invention.

Referring to FIG. 4, pressure regulating unit 80 has block 82, which is longer than block 12, and third pressure regulator 84, to regulate the high-pressure gas provided to high-pressure gas flow passage 40. Third pressure regulator 84 has inlet fitting 86, for connection to the source of high-pressure carbon dioxide, and pressure gauge 88, communicating with inlet fitting 86 to indicate the pressure of the source. Pressure regulator 84 has outlet fitting 90 connected to high-pressure gas flow passage 40 and pressure relief valve 92 communicating with the outlet at fitting 90. The right-hand opening to the high-pressure gas flow passage 40 is closed with plug 94, and pressure gauge 20 communicates with transverse passage 42 in line with pressure regulator 14. On pressure regulating unit 80, additional outlets and regulated pressure outlet fittings 32 have been provided downward from the transverse passage 62 communicating with pressure regulator 16.

Figure 5:
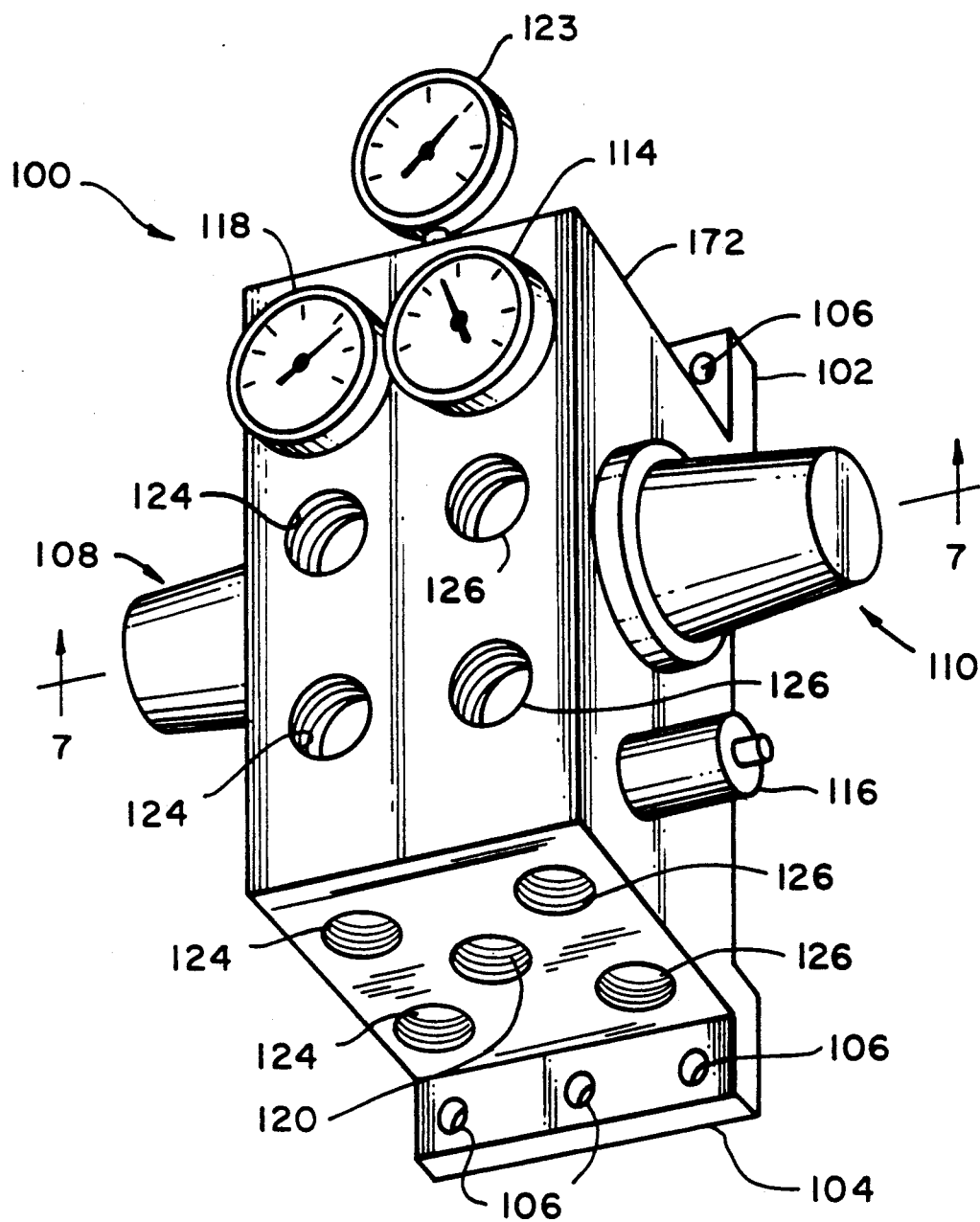
FIG. 5 is a perspective view of another alternative embodiment of a pressure regulating unit according to the invention.
Figure 6:
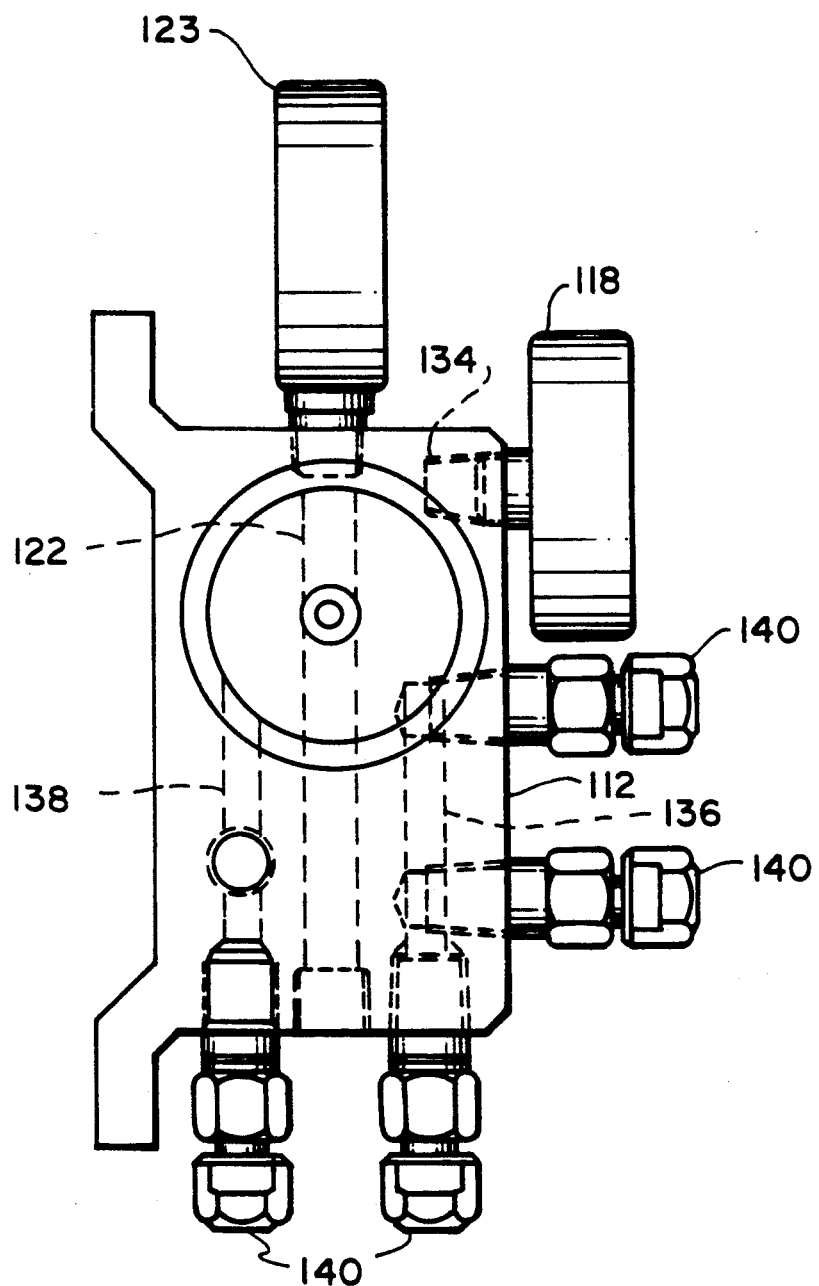
FIG. 6 is a side elevation of the FIG. 5 pressure regulating unit.
Figure 7:
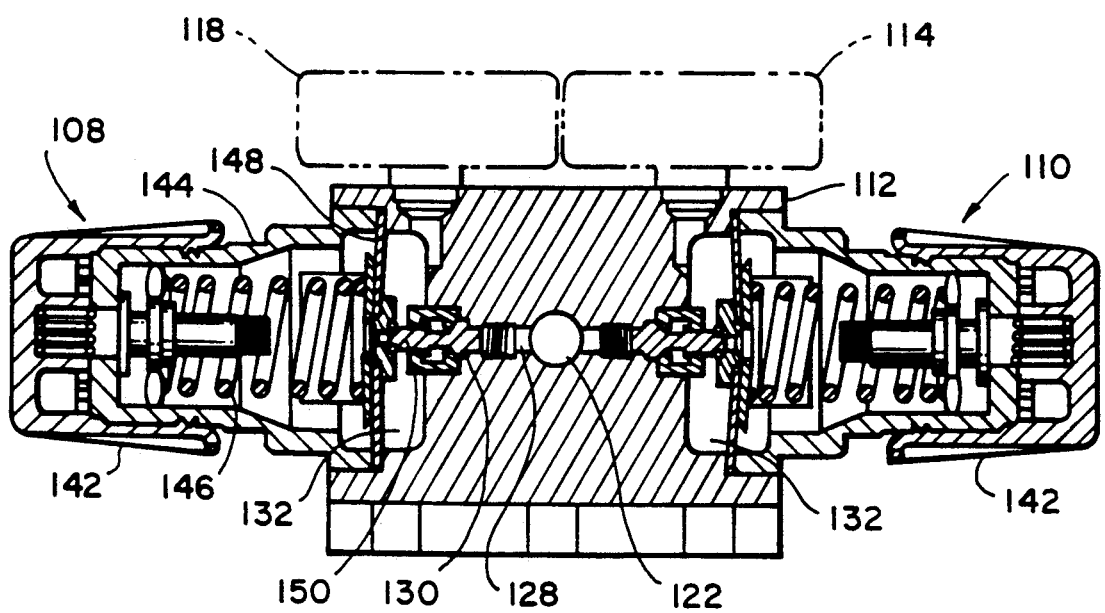
FIG. 7 is a horizontal sectional view, taken at 7—7 of FIG. 5, of the FIG. 5 pressure regulating unit.

Referring to FIGS. 5-7, pressure regulating unit 100 has a narrow, vertical profile and is designed to be mounted on a single vertical stud via top and bottom mounting legs 102, 104 having mounting holes 106 therethrough. Unit 100 has two pressure regulators 108, 110 extending from the two sides of block 112. It also has pressure gauge 114 and pressure relief valve 116 associated with pressure regulator 110 and pressure gauge 118 and similar pressure relief valve (not shown) associated with pressure regulator 108. High-pressure inlet 120 is located at the bottom of block 112 and communicates with high-pressure flow passage 122 extending vertically through block 112. High-pressure, pressure gauge 123 is threadedly connected to the top upper end of high-pressure flow passage 122. Pressure regulator 108 has four outlet ports 124. Pressure regulator 110 has four outlet ports 126.

As is seen in FIG. 7, high-pressure gas flow passage 122 communicates with horizontal passages 128 communicating with inlet valve passages 130. Block 112 also has reduced-pressure outlet chambers 132 formed therein. Chambers 132 communicate with respective horizontal passages 134 to pressure gauges 114 and 118 and also communicate with downwardly-directed front vertical passage 136 and downwardly-directed rear vertical passage 138 (FIG. 6). Passage 136 for pressure regulator 110 communicates with the two outlets 126 on the front surface of block 112 and the front outlet 126 on the bottom of block 112. Passage 138 for pressure regulator 110 communicates with the passage to pressure relief valve 116 and to the rear outlet 126 in the bottom surface of block 112. Passage 136 for pressure regulator 108 similarly communicates with the two outlets 124 on the front face of block 112 and the front outlet 124 on the bottom of block 112, and passage 138 for pressure regulator 108 similarly communicates with the pressure relief valve for it and to the rear outlet 124 in the bottom surface of block 112. Outlet fittings 140 are shown connected to outlets 124 on FIG. 6. Pressure regulators 108, 110 are identical in construction to pressure regulator 14 (FIG. 3) and include knobs 142, bonnets 144, springs 146, diaphragms 148, and inlet valves 150.

Manufacture

In manufacture, block 12 is made from an aluminum extrusion, and high-pressure gas flow passage 40 is formed therein as part of the extrusion process. Passages 42 and 60 are provided by drilling into block 12 from above and from below, and passages 62 are provided by drilling into block 12 from the sides. The openings to these passages are tapped to provide threaded connections for the fittings and plugs, and the fittings and plugs and pressure gauges are threadedly connected thereto. Mounting holes 36 are also provided by drilling through block 12. Horizontal holes are also drilled from the front surface into passages 62 and threaded at the openings to provide threaded connections for pressure relief valves 26, 28. Inlet valve passage 44, outlet chamber 48 and the threaded opening 54 are machined and tapped in the front surface of block 12.

Manufacture of pressure regulating units 80, 100 similarly involves drilling to provide the passages therein and machining to provide the outlet chambers.

Because all of the flow passages for units 10, 80, and 100 are within the respective blocks 12, 82, 112, the number of connections to be checked for leaks is reduced. In addition, the units are compact and easy to mount.

Operation

In operation, high pressure carbon dioxide supplied to inlet fittings 18, 90 and to inlet 120 is supplied through the high-pressure gas flow passages to the inlet valves of the respective pressure regulators. Referring, e.g., to FIG. 3, when the pressure in outlet chamber 48 is below a desired value, large spring 58 pushes valve 46 and unseats the opening to permit the high-pressure gas to flow into the reduced-pressure chamber and to the respective outlets, for use in displacing syrup used in carbonated beverage. As the pressure in the chambers increases, the diaphragms move outward to seal off valve 46.

Other Embodiments

Other embodiments of the invention are within the scope of the following claims.

What is claimed is:

1. A pressure regulating unit for providing controlled pressure for use in displacing syrups in a carbonated beverage dispensing system, said unit comprising
   a block made of a single piece of metal and having mounting means integrally provided thereon and a high-pressure gas flow passage provided therein, said high-pressure gas flow passage having a high pressure inlet for connection to a source of high-pressure gas and a first port for connection to a pressure regulator, and
   first and second pressure regulators that are supported on said block, said first regulator having a gas inlet communicating with said first port,
   wherein said high-pressure gas flow passage has a second port, and said second regulator has a gas inlet communicating with said second port, and
   wherein said block has an inlet valve passage and a reduced-pressure outlet chamber formed therein for each said pressure regulator, said inlet valve passages communicating with said first and second ports of said high-pressure gas flow passage, and wherein each said pressure regulator includes an inlet valve mounted within said inlet valve passage and a movable diaphragm sealably mounted over said outlet chamber, said block also having outlet ports formed therein communicating with respective said outlet chambers.

2. The pressure regulating unit of claim 1 wherein each said pressure regulator includes a bonnet that is threadedly attached to said block at threaded openings that are formed in said block and surround said outlet chambers.

3. The pressure regulating unit of claim 1 further comprising first and second pressure relief valves carried by said block and communicating with respective said outlet chambers via passages in said block.

4. The pressure regulating unit of claim 1 further comprising first and second pressure gauges carried by said block and communicating with respective said outlet chambers via passages in said block.

5. The pressure regulating unit of claim 4 further comprising a third pressure gauge carried by said block and communicating with said high-pressure gas flow passage.

6. The pressure regulating unit of claim 1 wherein said high-pressure gas flow passage extends to two surfaces of said block.

7. The pressure regulating unit of claim 1 further comprising first and second reduced pressure outlet passages communicating with respective said outlet chambers and extending to one or more surfaces of said block.

8. The pressure regulating unit of claim 6 wherein said block is formed of an extrusion, and said high-pressure gas flow passage extends along an extrusion axis from one end of the extrusion to the other.

9. The pressure regulating unit of claim 1 wherein said mounting means provides mounting contact surfaces on a back surface of said block, and said reduced-pressure outlet chambers open to a front surface of the block.

10. The pressure regulating unit of claim 9 further comprising pressure gauges mounted on side surfaces of said block and communicating with respective said reduced pressure outlet chambers, and wherein said high-pressure inlet opens to a side surface of said block.

11. The pressure regulating unit of 3 wherein said pressure relief valves are mounted on a front surface of said block.

12. The pressure regulating unit of claim 1 wherein said ports are provided by transverse passages extending transversely from said high pressure flow passage, said transverse passages extending to a top surface of said block, a pressure gauge communicating with one said transverse passage at the top of said block.

13. The pressure regulating unit of claim 1 wherein said mounting means provides mounting contact surfaces on a back surface of said block, and said reduced-pressure outlet chambers open to opposite side surfaces of the block.

14. The pressure regulating unit of claim 13 further comprising pressure gauges mounted on front surfaces of said block and communicating with respective reduced pressure outlet chambers.

15. The pressure regulating unit of claim 13 wherein said high-pressure gas flow passage opens to top and bottom surfaces of said block.

16. The pressure regulating unit of 3 wherein said pressure relief valves are mounted on side surfaces of said block.

17. The pressure regulating unit of claim 1 further comprising a third pressure regulator that is carried by said block and has a reduced pressure outlet connected to said high-pressure inlet.

18. The pressure regulating unit of claim 17 further comprising a pressure gauge carried by said third pressure regulator and communicating with a high-pressure inlet to said third pressure regulator.

19. The pressure regulating unit of 18 further comprising another pressure gauge carried by said block and communicating with said high-pressure gas flow passage.

* * * * *